Oct. 9, 1934.　　　　E. E. KOE　　　　1,976,174
FORM MEASURING DEVICE
Filed April 4, 1933　　　3 Sheets-Sheet 3
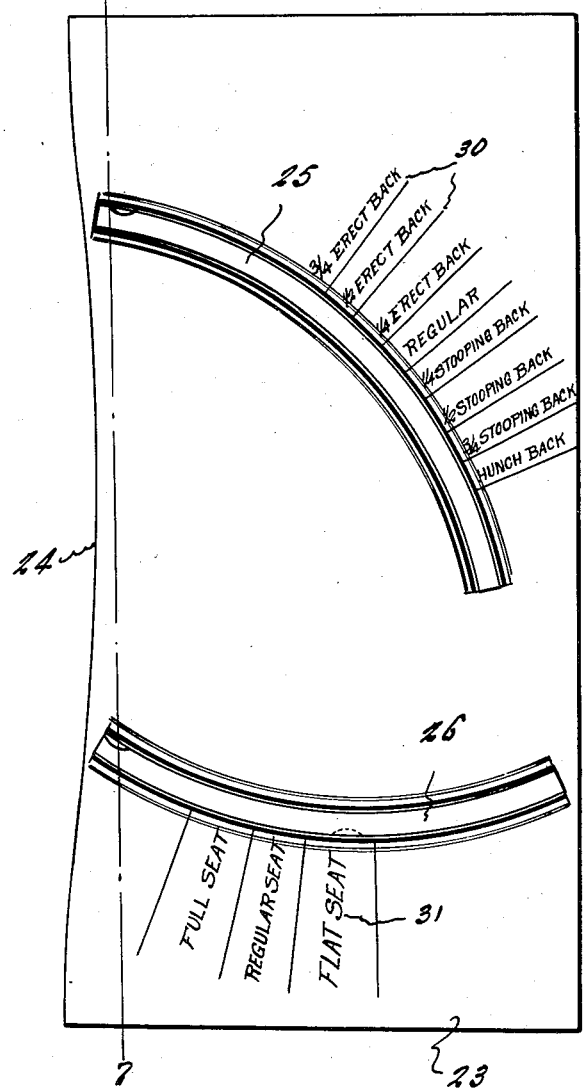
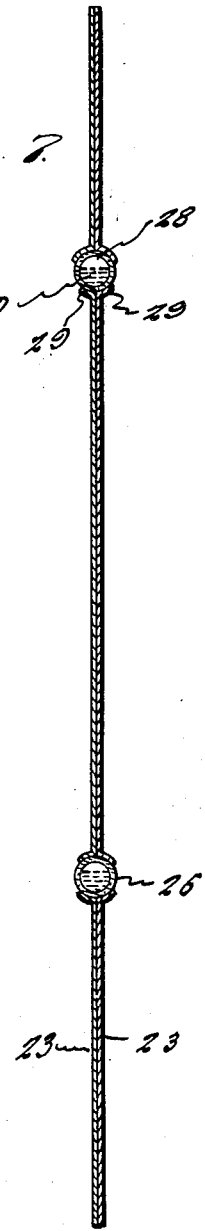
Inventor
Emil E. Koe
By Clarence A. O'Brien
Attorney Patented Oct. 9, 1934

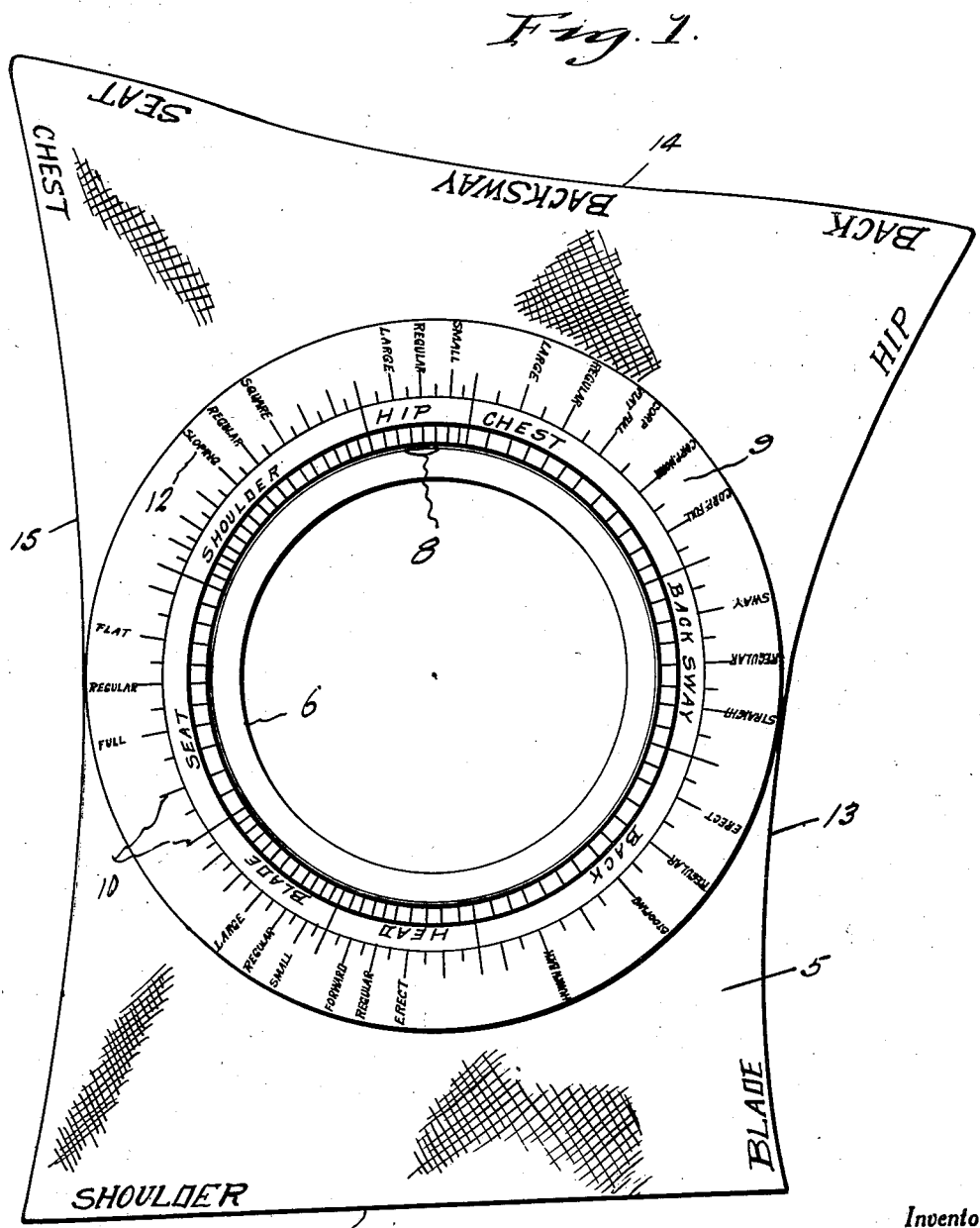

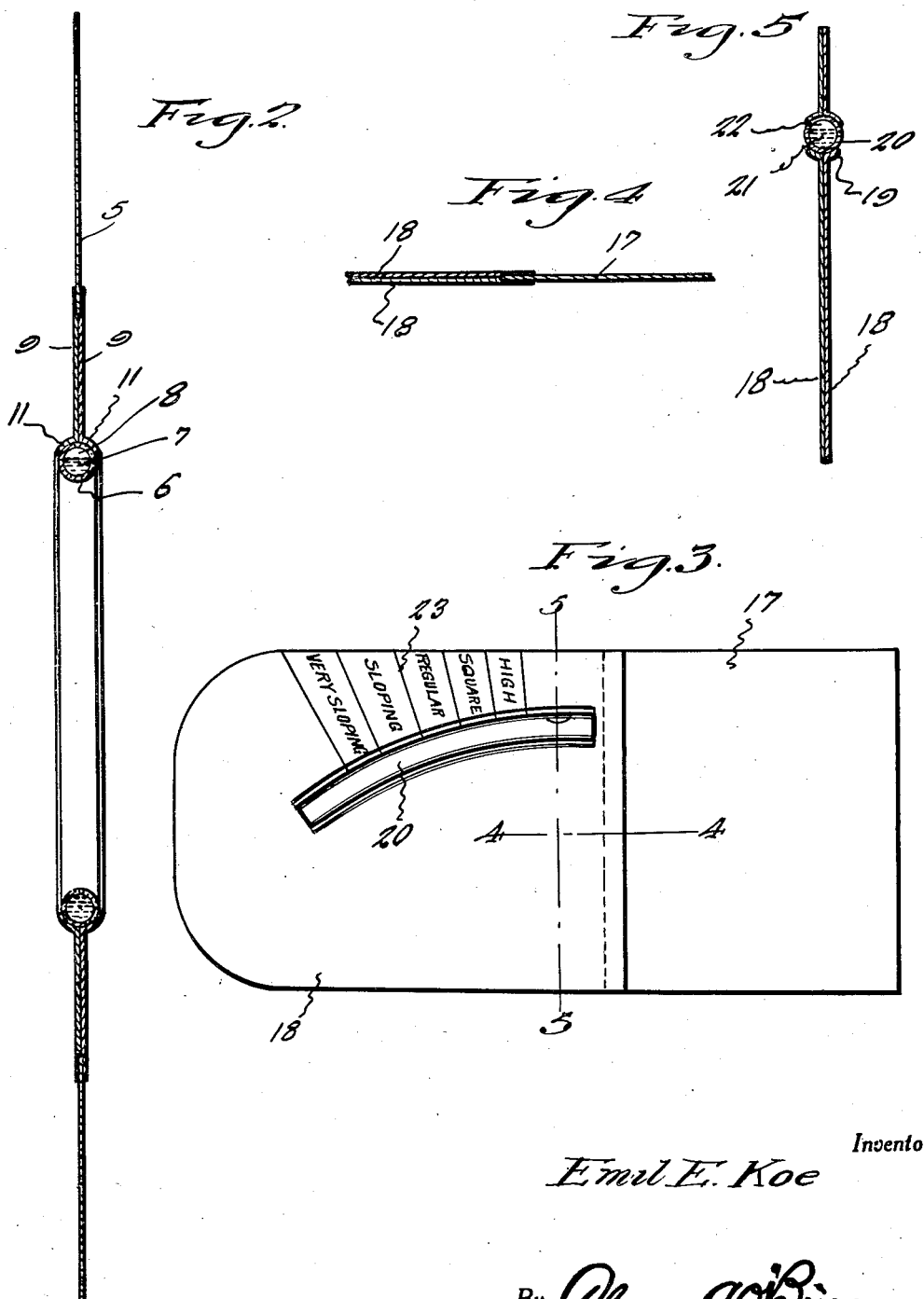

1,976,174

REISSUED

MAY 21 1940

UNITED STATES PATENT OFFICE 1,976,174

FORM MEASURING DEVICE

Emil E. Koe, Berwyn, Ill.

Application April 4, 1933, Serial No. 664,428

1 Claim. (Cl. 33—7)

This invention appertains to new and useful improvements in means for measuring the form of a human body for clothing.

The principal object of the present invention is to provide a form measuring device wherein a liquid gauge tube is employed which controls an air bubble as an indicator which is far more effective and efficient for measuring than the mechanical devices now employed.

Another important object of the invention is to provide a form measuring device which is of simple construction and because of the absence of mechanical elements is less susceptible to the development of defects than mechanical devices now employed.

Other important objects and advantages of the invention will become apparent to the reader of the following specification.

In the drawings:

Figure 1 represents an elevational view of the combination form of the invention.

Figure 2 represents a cross sectional view through the structure shown in Figure 1.

Figure 3 represents an elevational view of the singular device for measuring the slope of the shoulders.

Figure 4 represents a fragmentary enlarged sectional view taken substantially on line 4—4 of Figure 3.

Figure 5 represents a cross sectional view taken substantially on line 5—5 of Figure 3.

Figure 6 represents an elevational view of the device for measuring the form of the back.

Figure 7 represents a cross sectional view taken substantially on line 7—7 of Figure 6.

Referring to the drawings wherein like numerals designate like parts, it can be seen in the several devices that the gauge tubes are all formed of an arc of a true circle and their disposition is determined by average standard in human figures.

Figure 1 discloses the combined device which consists of a sheet 5 of stiff material having a circular central opening. Figure 2 discloses a circular transparent tube 6 having a liquid content 7. The liquid content is of such volume as to produce a small bubble 8 therein.

Numerals 9—9 represent two plies of preferably celluloid or some similar material marked off in degrees, as at 10 in Figure 1. These plies 9—9 are suitably cemented together, the same being of annular shape and engage against the inner edge portion of the sheet 5 at the aforementioned circular opening so that the sheet is clamped between these plies, while the inner edge portions of these plies are flared outwardly, as at 11, to form a rim for retaining the said tube 6.

Around the tube 6 on the plies 9—9 are suitable readings 12 denoting the particular formation of the part of a body being measured.

For instance, the curved edge portion 13 is employed when the hip is being measured, the irregular edge portion 14 when the back-sway back and seat are being measured, the curved edge portion 15 when the chest is being measured and the edge portion 16 when the shoulder is being measured and details of these measurements show up on the chart plies 9—9 in the manner substantially shown in Figure 1.

Figure 3 discloses the measuring device specifically for shoulder measuring and this consists of the fabric or other sheet 17 clamped between the end portions of the plies 18—18 which are suitably cemented or otherwise secured together. These plies 18—18 have an elongated arcuate slot therein and the edge portions of the plies at this slot diverge outwardly, as at 19, to provide a saddle for the liquid tube 20, containing a volume 21 of liquid of sufficient volume to produce a bubble 22. Measuring details in the form of indicia 23 are placed on the outer sides of the plies 18—18 in close proximity to the tube 20, so that the position of the bubble when in the act of measuring a shoulder, will determine by its proximity to one of the readings 23 the type of shoulder formation existing.

The form of the invention shown in Figure 6 is for measuring a human back and also for measuring the seat portion, the same consisting of the sheet made up of the plies 23—23. This sheet has one edge portion 24 irregularly cut for disposition along the person's back being measured.

Numeral 25 represents the gauge tube of arcuate shape for measuring the back, while numeral 26 represents the arcuate gauge tube for measuring the seat. Each of these tubes is placed in a slot in the said sheet and contains a liquid 27 of a volume permitting a bubble 28. Each of these tubes is retained in the sheet by outstanding flanges 29 on the plies at the said slot.

Detailed readings in the form of indicia 30 are located on the outsides of the plies adjacent the tube 25, as well as readings 31 adjacent the tube 26 indicating details of seat measurements.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A body form measuring device comprising a sheet having a double ply portion, said portion being provided with a body engaging edge, said plies having registering openings therethrough, a bubble glass disposed in the openings, the edge portions of the said plies, at the openings, being flared outwardly for engaging and retaining the said bubble glass and a scale on the bubble glass whereby the formation of the body portion engaged by the body engaging edge of the sheet can be measured.

EMIL E. KOE.